B. J. MILLER.
BURNER.
APPLICATION FILED MAY 19, 1915.
1,178,022.
Patented Apr. 4, 1916.
2 SHEETS—SHEET 1.
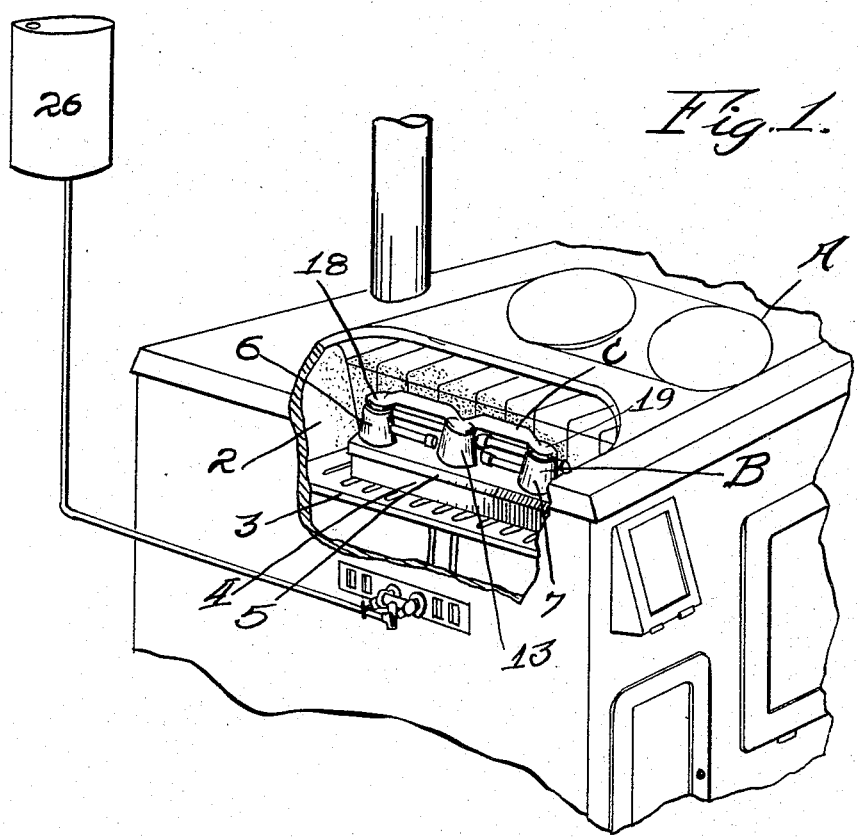
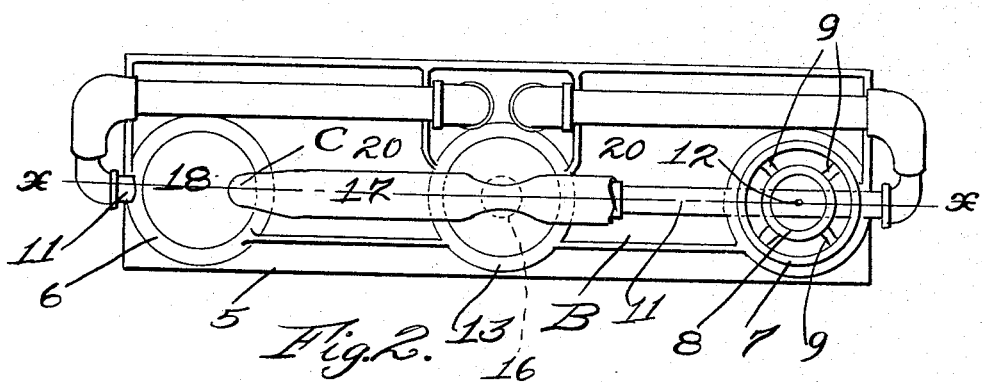
Inventor:
Benjamin J. Miller.
by: F. S. Bradbury
Attorney.

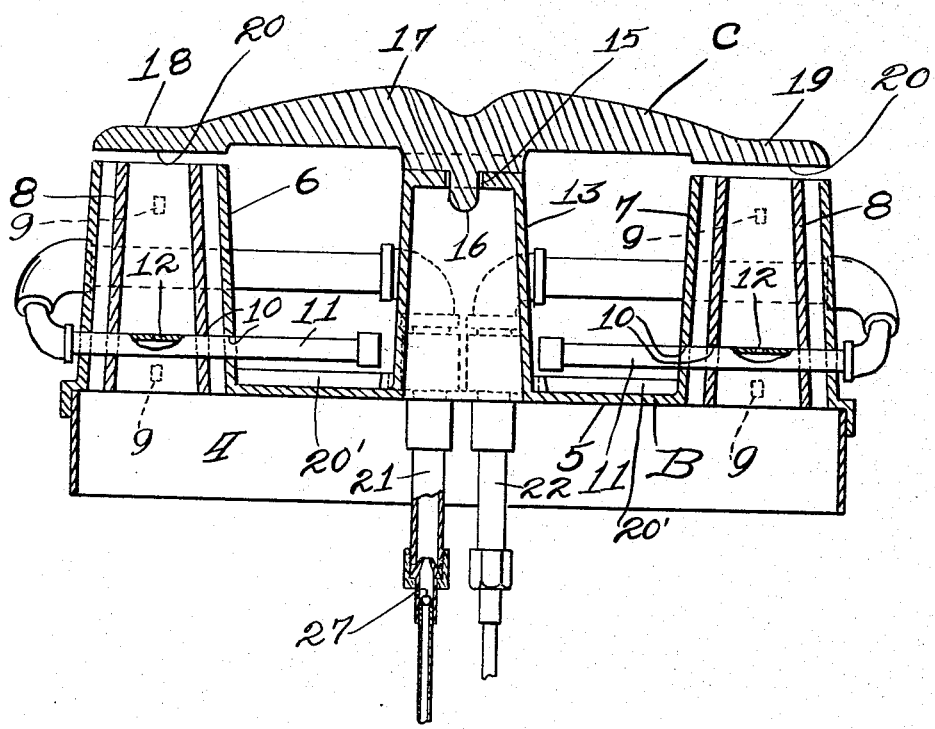
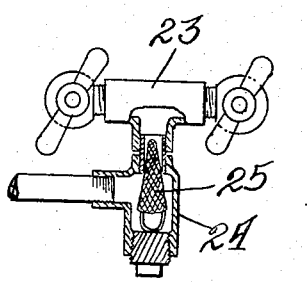

UNITED STATES PATENT OFFICE.

BENJAMIN J. MILLER, OF ST. PAUL, MINNESOTA.

BURNER.

1,178,022. Specification of Letters Patent. Patented Apr. 4, 1916.

Application filed May 19, 1915. Serial No. 29,078.

*To all whom it may concern:*

Be it known that I, BENJAMIN J. MILLER, a citizen of the United States, residing at St. Paul, in the county of Ramsey and State of Minnesota, have invented a new and useful Improvement in Burners, of which the following is a specification.

This invention relates to that class of liquid fuel burners, which are designed more particularly to be applied to cooking stoves and ranges by being placed in the fire pot thereof.

An object of this invention is to provide a burner of the kind stated, which is simple in construction, highly efficient in operation and easily applied to the fire pot of ordinary stoves and ranges without altering or modifying the structure thereof.

Another object of the invention is to so construct the burner as to thoroughly vaporize and control the fuel and mix air with the vapor and to produce an exceedingly hot flame.

A still further object is to provide the burner with a movable spreader, which can be turned away from directly over the burner when desired, thus causing the burner to concentrate or focus the heat produced by the flame issuing therefrom.

To these ends my invention comprises the features of construction and combination of parts hereinafter more particularly described and claimed.

In the accompanying drawings forming part of this specification, Figure 1 is a perspective of a stove partly broken away showing my improved burner in position within the fire pot; Fig. 2 is a plan of the burner removed from the stove; Fig. 3 is a longitudinal section of the burner taken on the line X—X of Fig. 2, and Fig. 4 is a view partly in section of a detail.

In the drawings A designates an ordinary cooking stove having the usual fire pot 2 and grate 3. On the grate is shown my improved burner B, comprising, for illustration a rectangular casing 4, which is open at the top and bottom. This casing supports a cover 5 forming a base, which has one or more similar upwardly projecting burner tubes, such as 6 and 7. These burner tubes are in the form of an outer tube tapering upwardly and within which is placed an inner tubular shell 8, corresponding in shape only of smaller dimensions than the outer tube. The inner and outer tubes are concentric approximately of the same length and spaced apart by a plurality of lugs 9 formed integral with and radiating outwardly from the face of the inner tube. The space within the inner tube admits air upwardly and forms what may be termed a primary mixing chamber for the materials of combustion; while the space between the inner and outer tubes forms an outer circular duct of substantially uniform size throughout its length, i. e., from its lower to its upper end, and is in the nature of a secondary mixing chamber. Due to the conformation of these parts, a more thorough mixture of the materials of combustion is accomplished as will be understood upon a further reading of the descriptive matter.

Placed across the lower portions of the outer and inner burner tubes through alined openings 10 is a liquid fuel supply pipe or duct 11 having a small orifice 12 through which liquid fuel is forced longitudinally upwardly through the inner burner tube. This pipe locks the inner tube in the outer tube. Located midway between the burners is a standard 13 formed upon the base plate 5 and having a central journal opening 15 in its upper end in which a pivot 16 projecting downwardly from the arm 17 of a spreader element C projects. This pivot journal serves to position deflectors 18 and 19 formed integral with the opposite ends of the arm 17 over the burners and permits the arm to swing into a position with the deflectors away from directly over the burners when desired. Each of the deflectors is formed with a lower surface such as 20 spaced slightly above the burner with which it directly coöperates and of sufficient area to deflect and evenly spread the mixture of gas and air outwardly and horizontally. The heat from the flame raises the temperature of the deflector or spreader sufficiently to effectively assist in vaporizing the liquid fuel and cause the combustible constituents to unite and burn. Normally the spreaders are placed over the burners as illustrated in the drawings, but when it is desired to concentrate the heat produced by the flame emitted by the burners, the deflectors can be swung away from directly over the burners. It will be noted that the heated tips of the burner tubes and the heated surface of the spreader causes heated air to commingle with the hottest gases in the flame, thus causing substantially complete combustion of the combustible constituents.

The feed pipe 11 which is employed in connection with each burner projects inwardly over a starting pan 20' formed on the base 5, and in starting the burner, a small amount of oil is poured either directly into the pan or upon ashes or other suitable material in the pan and ignited. The heat thus produced warms the supply pipe sufficiently to generate gas from the liquid fuel therein, said gas being forced upwardly through the orifice 12 and ignited to heat the walls of the burner and deflector above and start the burner. A separate supply pipe is shown for each burner and the feed connections 21 and 22 for fuel connected with said pipes lead around the burners and downwardly through the median portion of the base or cover plate 5 where they are connected to a valved supply coupling 23, which in turn is connected with a trap fixture 24 containing a strainer 25 for the liquid fuel. This trap connection can be connected with any suitable source of fuel supply such as the kerosene tank 26 placed above the stove sufficiently to force the liquid fuel upwardly through the burner supply pipe into the burner.

It is contemplated to construct my invention with one or any number of burner elements as desired, slight modifications of the construction which would be apparent to the skilled mechanic permitting of such change. A check valve 27 arranged in each of the connections 21 and 22 serves to equalize pressure of liquid fuel supplied to the burners and prevent fluctuations of the burner flames.

In accordance with the patent statutes I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention what I claim as new and desire to protect by Letters Patent is:

1. A burner of the class set forth, comprising a primary mixing chamber, a secondary mixing chamber arranged about said primary chamber, means communicating with said primary chamber for feeding fuel thereto and for securing said primary chamber within said secondary chamber, and deflecting means spaced above and extending over said chambers to assist in heating the burning constituents issuing from said chambers.

2. A burner of the class set forth, comprising a primary mixing chamber and a secondary mixing chamber, said primary chamber being removably disposed within said secondary chamber, means communicating with said primary chamber for feeding fuel thereto and for retaining said primary chamber within said secondary chamber, and deflecting means spaced above and extending over said chambers to assist in heating the burning constituents issuing from said chambers.

3. A burner of the class set forth comprising concentric inner and outer members extending upwardly, the inner member forming a primary mixing chamber and the outer member forming therewith a secondary mixing chamber, a fuel passage communicating with the primary chamber and means pivotally supported intermediate its ends above and extending over said chambers for mixing and deflecting the burning constituents issuing from said chambers, as and for the purpose specified.

4. A burner of the class set forth comprising, in combination, a plurality of sets of concentric primary mixing chambers and secondary mixing chambers, a fuel passage communicating with the primary chamber of each of said sets, and deflecting means loosely journaled intermediate its ends adapted to alternately coöperate with each of said sets of chambers, as and for the purpose specified.

5. A burner of the class set forth, comprising, in combination, a plurality of sets of concentric primary and secondary mixing chambers, a fuel passage arranged to project fuel upwardly into the primary mixing chamber of each of said sets, and a deflector comprising an arm formed with a plurality of deflector elements, each of said deflector elements being arranged to extend over the primary and secondary mixing chambers of one of said sets to assist in heating the burning constituents issuing therefrom and said arm being journaled to swing with its deflector elements from a position out of registration with the chambers of said burners.

6. A burner of the class set forth, comprising a primary mixing chamber, a secondary mixing chamber surrounding said primary mixing chamber, said secondary chamber being of substantially uniform size throughout and of approximately the same length as said primary chamber, means extending through said chambers for feeding fuel into said primary chamber and for removably securing such chamber within said secondary chamber, and deflecting means spaced above and extending over said chambers to assist in heating the burning constituents issuing from said chambers.

In testimony whereof, I have signed my name to this specification.

BENJAMIN J. MILLER.

Copies of this patent may be obtained for five cents each, by addressing the "Commissioner of Patents, Washington, D. C."